Aug. 20, 1940.　　　A. W. WENZEL　　　2,212,335

PACKING RING

Original Filed March 27, 1936

INVENTOR.
ALBERT W. WENZEL.
BY Howard P. King
ATTORNEYS

Patented Aug. 20, 1940

2,212,335

UNITED STATES PATENT OFFICE 2,212,335

PACKING RING

Albert W. Wenzel, West Orange, N. J.; Fidelity Union Trust Company, executor of said Albert W. Wenzel, deceased, assignor to Fidelity Union Trust Company, as trustee Original application March 27, 1936, Serial No. 71,087, now Patent No. 2,078,748, dated April 27, 1937. Divided and this application April 21, 1937, Serial No. 138,122

5 Claims. (Cl. 309—45)

This invention relates to piston rings and is a division of my prior application Ser. No. 71,087 issued as Patent 2,078,748 April 27, 1937.

The objects of the invention are to provide an improvement in piston rings which enables one or more sections to be effectively and efficiently utilized in each ring-receiving groove; to obtain improved oil seal where oil is not desired to pass, a better compression seal where that function is desired, as at the compression end of the cylinder, and improved lubrication throughout; to provide a separation of the sections against the piston lands; to provide for quicker seating, less side friction of the ring, less wear, and silencing of the blow of the ring land on the reverse of the piston stroke; to permit the ring to "breathe" freely; to store lubricant, grit and carbon collected; to transfer the oil freely and take care of excess of oil at one part of the cylinder by spreading less generously supplied areas; to utilize the ring structure in the groove for distributing the oil; to utilize the rings for actuating the oil along the cylinder surface; to enable the ring to glide over the oil in one direction and actuate the oil in the other direction of piston stroke; to secure simplicity of construction, as well as positive, effective and simple operation; and to obtain other advantages and results as may be brought out in the following description.

Figure 1:
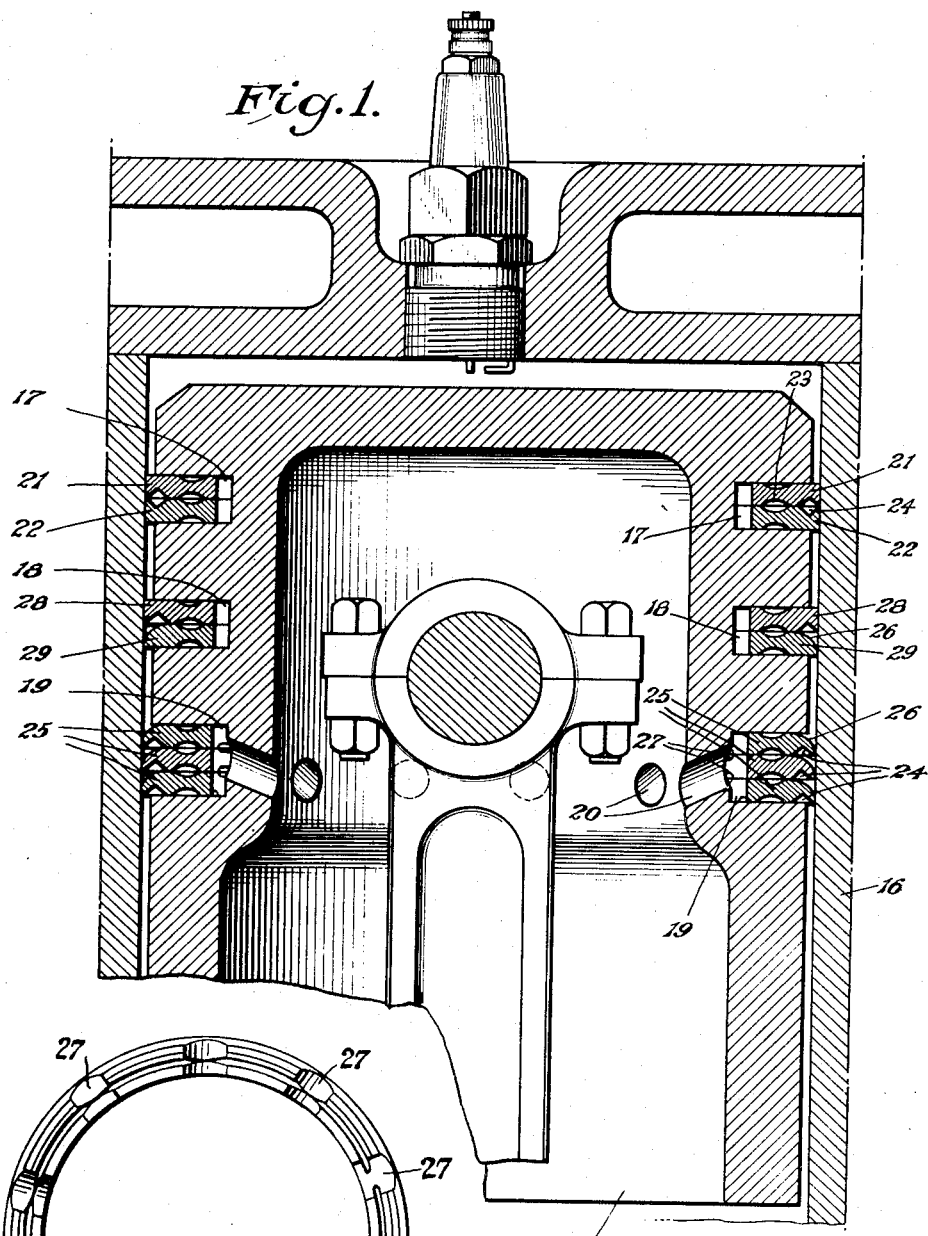
Figure 2:
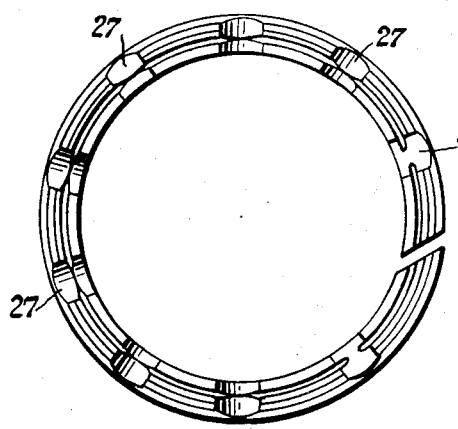

In the accompanying drawing wherein like numerals of reference indicate similar parts throughout the several views:

Figure 1 is a sectional view of a part of an engine, particularly that part including the cylinder and piston and showing rings of my improved construction mounted therein; and Figure 2 is a plan of a face of one of the rings having both the arcuate oil conveying grooves and the radial flow passages in the face thereof.

The invention is identical with that disclosed in the aforementioned application, and reference may be had to the showing therein for clarification of any details herein.

In the specific embodiment of the invention illustrated in said drawing, the reference numeral 15 designates a piston arranged to reciprocate longitudinally in a cylinder 16. The particular arrangement of parts illustrated shows the closed end of the piston at the top, and the open or crank-end of the piston toward the bottom. Thus they will be referred to as a matter of convenience of description. In the periphery of the piston is provided a plurality of piston-grooves, that is to say, grooves in the piston for receiving the piston rings. I use this term "piston-grooves" to avoid confusion hereinafter in connection with grooves to be described as formed in the rings. An alternative term often applied to these piston grooves is "ring-receiving grooves." In the present showing, furthermore, are illustrated three such piston grooves, of which the upper one 17 is shown with a sectional compression ring, the next or middle one 18 with a sectional combination ring therein, and the third or lower one 19 with a sectional oil-control ring therein. Drain openings 20 from this lower groove 19 to the interior of the piston are shown to return oil to the crank-case of the engine of which cylinder 16 is a part. If found desirable, the middle groove 18 may likewise have drain openings. The desirability of such drain openings for the middle piston groove depends upon the oil consumption. As to these several piston grooves, let it be said that the same are continuous circumferentially of the piston and normal to the axis of the piston as is usual with piston grooves. The material of the piston next the said grooves, particularly that part providing the plane surfaces of the grooves, is referred to as the "land" and this term applies not only to the material between grooves but to the material just beyond the upper and lower grooves.

Attention will now be given to the compression ring shown in upper groove 17. This ring is referred to as the compression ring because it takes the brunt of the compression created by the fuel explosion. A desired characteristic of such a ring is to form a tight seal to the escape of any of the compression. Other characteristics desired are to substantially prevent passage of oil beyond the compression ring. To accomplish these and other desideratums, I preferably employ a ring having a plurality of sections 21 and 22, such that the ring is divided upon a horizontal plane, that is to say, a plane parallel to the usually plane surfaces or "sides" of the ring. Both sections of this ring, as is the case with all the ring sections hereinafter described, are expanding ring sections, which is understood in the art to mean that the rings are resilient and, if not confined in a cylinder, will have a greater diameter than when confined in a cylinder in use, and it is further to be understood that the term implies that the ring is severed at one part thereof to accommodate the expansion and contraction of the ring to maintain a resilient working contact with the cylinder wall. The ring sections are movable one with respect to the other, and thus, should the force of the explosive compression exert a sufficient moment to contract the upper section 21, thereby permitting compression to pass the section, there will still be the lower section 22 in working contact with the cylinder to deter passage of the compression. The upper outer corners of these ring sections are sharp or acute, and by this term of "acute" corners, I include all angles of 90° or less between the intersecting faces of the ring forming the angle. Thus, the term includes the 90° angle of the upper corner of the upper section, as well as the less than 90° angle of the upper corner of the lower section 22 of this ring.

The said compression ring under discussion composed of sections 21, 22, and located in the upper piston groove 17, as well as the other rings yet to be described in detail, are proportioned with respect to the piston groove to provide adequate clearance therein. The amount of that clearance need not be dwelt upon at length here. Suffice it to say, it is of appropriate amount for the working conditions involved, and thus will include those clearances which this art has come to recognize under the terms of both "normal" clearance and "more than normal" (sometimes also called "abnormal") clearance. The ring sections are therefore free to move in the groove and free to move, as hereinbefore described, with respect to each other.

It is desirable that the ring have lubrication for insuring its free movement within the groove, and it is also desirable that the sections be lubricated between their juxtaposed surfaces. These desideratums are shown accomplished by provision of lubricating or oil-transferring grooves 23 in the upper and lower plane surfaces of each section. Said oil-transferring grooves 23 are preferably cut or otherwise formed to provide a continuous oil passage circumferentially of the ring which extends to both "ends" of the ring, said ends being resultant upon the severance of or transverse split in the ring. Said grooves 23 have appropriate depth to accommodate the desired quantity and flow of oil therein, and are likewise designed to also receive and retain particles of carbon, grit and the like, until carried off, which may enter between the sections or between the ring and the lands. The continuity of groove 23 introduces the advantage of permitting oil to circulate throughout the circular path thus provided in the ring washing out the grit, etc. Flowing oil does not carbonize so readily and coats more effectively. The said grooves 23 are furthermore so placed and related, that the one in the under side of the upper section will register with the one in the upper side of the lower section, thereby providing a circular channel within the ring between the ring sections. Furthermore, said grooves 23 perform numerous other functions, amongst which may be mentioned those of quicker seating, less side friction, free "breathing" of the ring, remaining of the ring in more constant contact with the cylinder, provision of oil cushions, silencing of the blow of the piston land against the ring at reverse stroke, lessening of groove wear, square seating of the ring in the groove due to symmetry, and other advantages.

The cylinder-engaging face of the ring sections 21 and 22, is preferably made less than the overall dimension of the ring. In other words, when the said ring sections are positioned flatwise together, there will be a gap between the two sections circumferentially of the ring at the edge thereof toward the cylinder. That gap never closes, but will increase upon any separation of the ring sections. In the faces of the sections which are juxtaposed to each other in use, and immediately adjacent the outer circumference of the sections, are provided annular recessions 24, which, in effect, constitute enlargement within the ring of the gap at the edge of the ring. The inner part of this enlargement tapers back to the plane of juxtaposition of the sections, and therefore oil forced into said enlargement will tend to wedge its way between the sections. It is to be noted in connection with this compression ring, that both edges of the peripheral gap are acute angles to the cylinder, and therefore the scraping of such small amounts of oil from the cylinder wall as may be left thereupon by the lower rings into the enlargement 24 during movement of the piston occurs in both directions. Also it may be pointed out that the juxtaposed grooves 23, together forming the circular channel mentioned, constitute a reservoir for the oil.

Next, describing the ring disclosed as mounted in the lower one of the three piston grooves, namely, the ring in piston groove 19, there is shown an oil-control ring consisting of three sections 25. This particular showing illustrates all three of the sections identical one with the other. It likewise illustrates each of those sections as having upper and lower oil-conveying grooves 23 similar to the showing of the oil-conveying grooves 23 in the sections of the compression ring above described, and with the same purposes and effects. The under face of each of these sections 25 of the oil-control ring are likewise provided with an annular recession 24 next the outer peripheral edge of the section, also similar to the corresponding recession 24 in the lower face of the upper section of the compression ring. As before described, this recession forms a sharp scraping edge against the cylinder, and therefore this oil-control ring will scrape substantially all of the oil from the cylinder wall during the down-stroke of the piston, and the action, coupled with the shape of the recession will obtain a pressure and movement of oil radially inward of the ring beneath the surface of the section thereof having the recession. The oil is thus forced into the circular oil passage 23. As this ring is closer to the oil supply for the cylinder wall, a far greater amount of oil is normally scraped from that wall by this oil-control ring than is scraped by the compression ring at the top of the piston. In fact, it is the purpose to scrape substantially all of the oil from the cylinder wall by this ring and leave only enough to be scraped by the other rings thereabove to provide for their lubrication and proper functioning. It is therefore desirable and preferable to provide for the escape of a large part of the oil from this oil-control piston groove 19 through the drain holes 20.

The outstanding difference between the several sections 25 of the oil-control ring and the upper section of the compression ring as shown, is to be found in the provision of rounded corners at the upper outer edges of those sections. These rounded corners are, when viewed in cross-section, upon a radius of a length preferably not less than the thickness (axially of the ring) of the ring section, and preferably exceeding of said thickness. Thus, the center of curvature is not within the area occupied by the ring, and the peripheral scraping surface is initially (that is, upon installation of the ring in a motor) at an angle to the wall of the cylinder at the lower outer edge portion of the section. This provides for quick seating of the ring, by permitting rapid wear to create an outer periphery on the ring in surface engagement with the cylinder. Furthermore, the curved or "radius" edge enables in use that on the up-stroke of the piston, the ring section will tend to glide over the oil with minimum scraping action. This ring accordingly tends to scrape oil back toward the crank-case end of the cylinder. The rounded edge, combined with the opposed tapering of the adjacent recession 24 of the ring section thereover, will obtain the wedging action of the oil to enter between sections similar to the action as described in connection with the compression ring. While corners 26 of the oil-control ring have been described as to the one specific showing appearing in the drawing, it is to be understood that the invention contemplates broadly the provision of a corner which glides, at least to some extent, over the oil, as distinguished from the positive maximum scraping obtained with an acute angle. Thus, a degree of gliding may be obtained where the corner is chamfered, either strictly frusto-conical in shape, or a modification of such shape, as by convexing or concaving the chamfer.

A further characteristic of the oil-control ring, as clearly illustrated resides in the provision of transverse or radial flow passages or depression 27 in one or more of the plane faces of the ring sections. These transverse or radial passages 27 each across the circular oil-transferring grooves 23, and the invention contemplates the provision of such intersecting grooves regardless of what depth may be given to either. The quantity of oil upon a cylinder wall is quite irregular, and by virtue of the intersecting passages in my improved ring, the excesses may be received and distributed by flowing around the circular passage. Thus I accomplish an equalization of the oil received so as to dispose of it more effectively, and at the same time I maintain as nearly as possible an even spreading force throughout the juxtaposed areas of the sections. Sinking of the circular oil passage to a depth greater than the depth of the several transverse oil passages is preferable, in that it allows the oil to flow freely from the overloaded transverse passages to those adjoining. I wish to point out at this time, likewise, that it is preferable to provide the circular oil passage as well as the transverse oil passages with rounded bottoms and rounded transitions to the outer or plane faces of the sections (as viewed in cross-section of the respective passages) in distinction from angular or flat bottoms and corners, so as to maintain the strength of the ring section and give it all possible re-inforcement.

In the middle piston groove 18, is shown what may be termed a combination ring, here illustrated as comprising two sections, the upper one 28 of which is substantially identical with the upper section of the compression ring, whereas the lower one, 29, is shown substantially like one of the sections 26 of the oil-control ring. It is, therefore, a combination compression and oil-control ring, for assisting in reduction of oil consumption without affecting the compression seal.

Although in the foregoing description as well as in the drawing I have set forth only a certain exemplification of the inventive concept by way of illustration thereof, it is to be understood that other examples, modifications and changes may be made in the construction, manufacture and use of my invention, and I do not wish to be considered as limiting myself to the specific exemplification except as set forth in the following claims when construed in the light of the prior art.

I claim:

1. A piston ring having inner and outer peripheral walls and having parallel side walls, both said side walls having radial grooves crossing the same from the outer to the inner circumferences, said grooves being open to the passage of oil therethrough, and arcuate grooves in both said side walls connecting successive radial grooves thereof intermediate the ends of said radial grooves between the said inner and outer circumferences.

2. A piston ring having inner and outer peripheral walls and having parallel side walls, both said side walls having radial grooves crossing the same from the outer to the inner circumferences, said grooves being open to the passage of oil therethrough, and the grooves of one side wall being directly opposite to the grooves of the other side wall, and arcuate grooves in both said side walls connecting successive radial grooves thereof intermediate the ends of said radial grooves between the said inner and outer circumferences.

3. A piston ring having inner and outer peripheral walls and having parallel side walls, both said side walls having radial grooves crossing the same from the outer to the inner circumferences, said grooves being open to the passage of oil therethrough, and the grooves of one side wall being staggered with respect to the grooves of the other side wall, and arcuate grooves in both said side walls connecting successive radial grooves thereof intermediate the ends of said radial grooves between the said inner and outer circumferences.

4. A piston ring for a piston having a piston groove for reception of said ring and having lands next said groove, said ring having sections superposed one upon another and of which the lower one has a lower face next the lower land of the groove and an oil-scraping edge at the outer periphery of said lower face, said lower face of said lower section likewise having oil passages extending across said face from one periphery to the other thereof, and said piston groove having a discharge opening to the interior of the piston, whereby oil may be copiously scraped by and discharged past said lower scraping edge and into said passages and thence to the piston discharge openings, the upper section of the ring serving to prevent any substantial escape of oil outwardly upward from the groove.

5. A piston ring for a piston having a piston groove for reception of said ring and having lands next said groove, said ring having sections superposed one upon another and of which the lower one has a lower face next the lower land of the groove and an oil-scraping edge at the outer periphery of said lower face, said lower face of said lower section likewise having oil passages extending across said face from one periphery to the other thereof, and said piston groove having a discharge opening to the interior of the piston, whereby oil may be copiously scraped by and discharged past said lower scraping edge and into said passages and thence to the piston discharge openings, the upper section sealing at its inner periphery with respect to the upper land of the piston groove and having an outer lower scraping edge for both scraping and preventing any substantial passage of oil thereat in use.

ALBERT W. WENZEL.